June 16, 1953

A. L. LINDOW 2,642,517

METHOD OF PROTECTING BUTT FLASH WELDED
ARTICLES FROM WELD SPLATTER

Filed Nov. 13, 1951

*INVENTOR.*
ARTHUR L. LINDOW
BY
*ATTORNEY*

Patented June 16, 1953

2,642,517

UNITED STATES PATENT OFFICE 2,642,517

METHOD OF PROTECTING BUTT FLASH WELDED ARTICLES FROM WELD SPLATTER

Arthur L. Lindow, Macedonia, Ohio, assignor to The Cleveland Pneumatic Tool Company, Cleveland, Ohio, a corporation of Ohio Application November 13, 1951, Serial No. 255,993

6 Claims. (Cl. 219—10)

1

This invention relates broadly to butt flash welding, but more particularly to an improved process for protecting the surfaces of the pieces intended to be welded from weld splatter.

In the process of butt flash welding of two members, molten metal is ejected from the mating faces by the arc during the burn off period before upsetting. This molten metal or splatter, when it struck the surfaces of the members being welded, tightly adhered thereto and almost became an integral part thereof. Consequently the area adjacent to the weld became covered with this splatter, which not only was detrimental to the appearance of the welded pieces, but also increased their weight, and in cases where smooth surfaces were required, the removal of such splatter became a major and expensive operation.

It is therefore the object of this invention to provide an improved process through which the weld splatter may be reduced in the immediate vicinity of the weld joint and entirely eliminated in the area adjacent thereto.

Another object of this invention is to provide a simple and efficient method of removing weld splatter from the interior of tubular welded members.

Another object of this invention is to provide a simple method of protecting the surfaces of members intended to be welded from weld splatter, by using protective shields which can readily be removed from the welded members after welding.

Another object of this invention is to reduce the amount of flash present at the welded joint, that is, the amount of material which is ejected from the faces of the mating parts during upset and does not form a structural part of the weld, Other objects of this invention not at this time more particularly enumerated will be clearly understood from the following detailed description.

Figure 1:
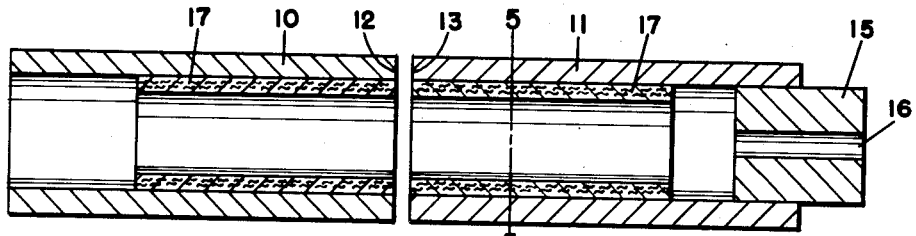
Figure 1 is a longitudinal sectional view of two tubular members intended to be welded, and illustrating the protecting shields located in the interior thereof.

Referring to the drawings, 10 and 11 represent tubular members whose adjacent ends 12 and 13 respectively are intended to be butt welded. Inserted in the end of one member,

2 there is a plug 15 having a central port 16 extending therethrough.

Located in each member near the end thereof intended to be welded, there is a sleeve-like shield 17 of an external diameter substantially equal to the internal diameters of the members 10 and 11, thereby causing the shields to fit rather tightly in the members. The shields are long enough to cover the surfaces adjacent to or in the vicinity of the intended weld. They are preferably made of paper or other combustible material, either organic or inorganic or a combination of both. They are made sufficiently thick to assure rigidity and prevent deformation when subjected to welding heat.

Figure 2:
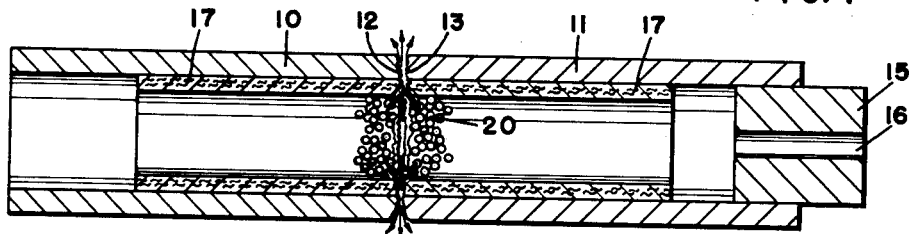
Figures 2, 3 and 4 are views similar to Figure 1, showing the parts in positions which they occupy successively during the welding operation.
Figure 3:
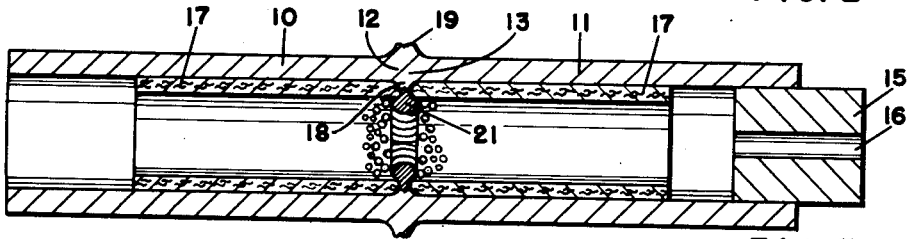
Figure 4:
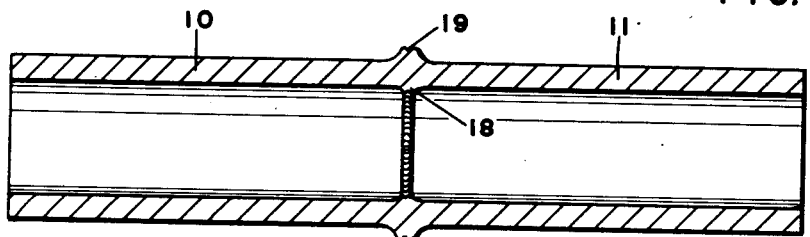
Figure 5:
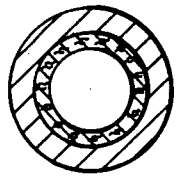
Figure 5 is a cross sectional view taken on line 5—5 in Fig. 1.

With the shields 17 located in the tubular members 10, 11 and adjacent the ends thereof to be welded, the butt flash welding operation may be effected in the usual manner. As is well known in this art, when electric current is caused to flow through the members and their ends are moved toward each other substantially as shown in Fig. 1, an electric arc will take place between the ends 12, 13. This arc will cause the end portions of the members to melt and as the members 10, 11 are pushed toward each other into abutting relation, as shown in Fig. 2, the abutting ends of the members 10, 11 start to be fused together and upon further endwise pressure the abutting ends are completely fused or welded together as shown in Fig. 3. As the two members 10, 11 are pushed together, it causes some of the molten metal to flow radially and form an internal annular bead of upset metal 18 and a similar external bead 19, while the extraneous material extruded during the upsetting operation forms internal and external flashes, the internal one being shown at 21.

During the welding operation just described, and especially before the members 10, 11 are pushed into abutting relationship as shown in Fig. 2, a certain amount of metal suddenly molten by the electric arc will forcibly be ejected from the ends 12, 13 externally and internally thereof. As this ejected metal or splatter 20 strikes the inner walls of the members adjacent the weld, it would, except for the shields 17, tightly adhere to the walls and cause the inner surface adjacent to the weld to become coated with coarse, unevenly distributed and very hard metal. With the shields 17 protecting the inner walls of the members 10 and 11, the splatter is deposited on the inner walls of the shield rather than on the inner walls of the members being welded. In order to prevent combustion of the shields from the welding heat, there is introduced into the interior of the members 10, 11 through the port 16 of the plug 15 a gas adapted to remove the oxygen from the interior of the members 10, 11 and from the shields 17. This gas can be an inert gas such as helium or argon, but preferably it is a combustible natural gas which has the additional advantage of producing a non-oxidizing atmosphere inside the members 10, 11 and results in less oxidized metal. This gas is turned on just before the welding current is caused to flow though the members 10, 11 and is turned off as soon as the current is cut off. With the oxygen thus removed from the interior of the members 10, 11 and shields 17, combustion of the paper shields is impossible.

Once the weld is completed and the plug 15 removed, it is a relatively simple operation to remove the shields 17 and splatter 20 from the interior of the members. To that end, the shields can either be burned off by subsequent thermal treatment and the splatter shaken out of the members, or in assemblies where the weld is readily accessible, the flash 21 and shields 17 can be knocked out by the use of a bar or the like.

In some instances, it is preferable to replace the two shields 17, by a single but longer one extending longitudinally on both sides of the weld. This single shield is especially desirable when internal means is needed to assist in the aligning of the members. In such event, the single shield in addition to its protective function also acts as an aligning bushing between the two tubular members.

The interior of tubular members such as 10, 11 is the most practical and common application of the invention. However, instead of using tubular shields, irregular shapes could be protected in a similar manner by coating the surfaces near the weld with a pulp, and allowing it to dry before proceeding with the welding operation.

From the foregoing, it will be understood that the invention provides for protective shields preferably made of combustible material which is prevented from burning during the welding operation by the introduction of combustible and inert gas to eliminate oxygen. It will also be understood that by using protective shields in the manner above specified, the surfaces of the welded pieces adjacent to the weld remain free of splatter, thereby eliminating the tedious and expensive operation heretofore necessary to remove this splatter.

Having thus described the invention, what I claim is:

1. In conjunction with the butt flash welding of two tubular members, the process of protecting the inner walls of said members from weld splatter which consists of inserting into each member adjacent to the end intended to be welded a combustible tubular shield of sufficient thickness to assure rigidity, preventing its combustion from the welding heat by removing oxygen from said shield, and subsequent to welding burning off said shields and removing the loose splatter from the interior of the welded members.

2. In conjunction with the butt flash welding of two tubular members, the process of protecting the inner walls of said members from weld splatter which consists of inserting into each member adjacent to the end intended to be welded a combustible tubular shield of sufficient thickness to assure rigidity, removing oxygen from said shield to prevent its combustion from the welding heat by introducing a gas into the interior thereof, and subsequent to welding burning off said shields and removing the loose splatter from the interior of the welded members.

3. In conjunction with the butt flash welding of two tubular members, the process of protecting the inner walls of said members from weld splatter which consists of inserting into each member near the end thereof intended to be welded a tubular paper shield of sufficient thickness to assure rigidity and of external diameter substantially equal to the internal diameters of said members, removing oxygen from said shield to prevent its combustion from the welding heat by causing a gas to flow therethrough during welding, and thereafter burning off said shields and removing the loose splatter from the interior of the welded members.

4. In conjunction with the butt flash welding of two members, the process of protecting said members from weld splatter which consists of covering the surfaces of said members in the vicinity of the intended weld with paper shields, preventing combustion of said shields from the welding heat by removing oxygen therefrom, and subsequent to welding burning off said shields and removing loose splatter from said members.

5. In conjunction with the butt flash welding of two members, the process of protecting the surfaces of said members in the vicinity of the intended weld from weld splatter which consists of covering said surfaces with a combustible shield, preventing combustion of said shield from the welding heat by causing a gas to flow over said shield and remove oxygen therefrom, and subsequent to welding burning off said shield and removing the loose splatter from said members.

6. In conjunction with the butt flash welding of two tubular members, the process of protecting the inner walls of said members from weld splatter which consists of inserting into each member adjacent to the end intended to be welded a paper shield of sufficient thickness to assure rigidity, preventing its combustion from the welding heat by removing oxygen from said shield, and subsequent to welding removing said shields and loose splatter from the interior of the welded members.

ARTHUR L. LINDOW.

References Cited in the file of this patent

UNITED STATES PATENTS

| Number | Name | Date |
|---|---|---|
| 1,363,356 | Sander | Dec. 28, 1920 |
| 1,679,702 | Wysong | Aug. 7, 1928 |
| 1,971,369 | Coryell | Aug. 28, 1934 |
| 2,031,863 | Snell | Feb. 25, 1936 |
| 2,188,925 | Ronay | Feb. 6, 1940 |
| 2,241,216 | Phelps | May 6, 1941 |
| 2,433,296 | Schaefer | Dec. 23, 1947 |